United States Patent
Ray et al.

(10) Patent No.: US 11,761,152 B2
(45) Date of Patent: Sep. 19, 2023

(54) SOIL FORM SYSTEM SUPPORTING HARDSCAPE THEREOVER

(71) Applicant: DeepRoot Green Infrastructure, LLC, San Francisco, CA (US)

(72) Inventors: Charles Graham Ray, Mill Valley, CA (US); Jeffrey Shawn Freedberg, Kensington, CA (US); John Joseph Cogger, Santa Ana, CA (US); Patrick Brien Greeley, Minnetonka, MN (US)

(73) Assignee: DeepRoot Green Infrastructure, LLC, San Francisco, CA (US)

( * ) Notice: Subject to any disclaimer, the term of this patent is extended or adjusted under 35 U.S.C. 154(b) by 294 days.

(21) Appl. No.: 16/833,015

(22) Filed: Mar. 27, 2020

(65) Prior Publication Data
US 2020/0308775 A1    Oct. 1, 2020

Related U.S. Application Data

(60) Provisional application No. 62/826,625, filed on Mar. 29, 2019.

(51) Int. Cl.
*E01C 3/00*    (2006.01)
*E01C 9/00*    (2006.01)

(52) U.S. Cl.
CPC .............. *E01C 3/006* (2013.01); *E01C 9/005* (2013.01)

(58) Field of Classification Search
CPC ................................. E01C 3/006; E01C 9/005
USPC ......... 101/17–36, 72–75; 404/17–36, 72–75; 405/302.4–302.7
See application file for complete search history.

(56) References Cited

U.S. PATENT DOCUMENTS

| | | | | |
|---|---|---|---|---|
| 5,030,343 A | * | 7/1991 | Urriola | E02B 11/00 210/170.03 |
| 5,373,661 A | * | 12/1994 | Furukawa | E02B 11/00 47/65.9 |
| 5,636,938 A | * | 6/1997 | Ragazzo | E02B 3/127 405/15 |
| 6,779,946 B1 | * | 8/2004 | Urriola | E01F 5/00 405/43 |
| 7,249,912 B2 | * | 7/2007 | Reese | B63B 3/08 404/31 |
| 7,676,987 B2 | * | 3/2010 | Yoshida | A01G 9/033 47/1.01 F |
| 7,765,744 B2 | * | 8/2010 | Herron | F42D 5/045 52/79.5 |

(Continued)

FOREIGN PATENT DOCUMENTS

WO    WO2014161039    10/2014

*Primary Examiner* — Raymond W Addie
(74) *Attorney, Agent, or Firm* — DLA PIPER LLP (US)

(57) ABSTRACT

Soil form structure for supporting hardscape and corresponding vehicle, pedestrian traffic, and other loads while maintaining uncompacted or loosely compacted soil underneath. A number of cell structures may be coupled to each other, where each cell has a strong yet lightweight and open structure that can accept uncompacted soil, vegetation roots, utilities, and the like within at least approximately 85-90% of its volume, while also allowing hardscape to be poured or formed thereon. Thus, cell structures allow for hardscape to be integrally formed with the cell structures, without need for an underlying layer of highly compacted soil or other hardscape support.

20 Claims, 8 Drawing Sheets

(56) References Cited

U.S. PATENT DOCUMENTS

| | | | | |
|---|---|---|---|---|
| 8,065,831 | B2* | 11/2011 | Ray | A01G 13/0237 47/32.7 |
| 10,030,337 | B2* | 7/2018 | Kim | E01C 9/002 |
| 10,415,260 | B2* | 9/2019 | Gooden | E01C 3/006 |
| 10,731,309 | B2* | 8/2020 | Adams | B65D 88/1656 |
| 2007/0181197 | A1* | 8/2007 | Krichten | E03F 1/005 137/833 |
| 2008/0063935 | A1 | 3/2008 | Ray | |
| 2017/0347539 | A1 | 12/2017 | Ray | |

* cited by examiner

SOIL FORM SYSTEM SUPPORTING HARDSCAPE THEREOVER

CROSS REFERENCE TO RELATED APPLICATION

This application claims priority to, and the benefit of, U.S. Provisional Patent Application No. 62/826,625, filed on Mar. 29, 2019 and titled "Improved Landscape Systems," which is hereby incorporated by reference in its entirety.

BACKGROUND

Embodiments of the disclosure relate generally to soil form systems. More specifically, embodiments of the disclosure relate to soil form systems for supporting hardscape.

SUMMARY

The design of many modern dense urban landscapes often calls for the placement of trees or other vegetation within paved-over areas or areas covered by other hardscapes. In particular, such designs often call for vegetation to be placed in close proximity to roads, sidewalks, and other load bearing pathways. However, the design and construction methods of these pathways and the loads they carry often compact the soil underneath to such an extent that it is difficult for vegetation roots to sufficiently penetrate the soil. As a result, trees or other vegetation planted in close proximity to these hardscapes may not survive or grow to the full extent envisioned.

Accordingly, to overcome the compacting of soil caused by hardscape construction, and the accompanying stunting of vegetation growth, systems and methods are described herein for maintaining uncompacted soil underneath hardscapes. A soil form is placed, comprising a base; one or more legs affixable to the base; one or more first top members affixable to the one or more legs and having an opening therein; and a second top member affixable to the one or more first top members to cover the opening. The base, the one or more legs when affixed to the base, and the first top member when affixed to the one or more legs, define a volume. Furthermore, the opening is sized to accept loosely compacted soil poured therethrough and into the volume. The one or more legs, the one or more first top members, and the second top member are configured to accept and support both a hardscape formed on the one or more first top members and the second top member, and a traffic load thereon, while maintaining the soil within the volume in the loosely compacted state.

Thus, one or more soil forms may be placed, and loosely compacted soil may be poured through the opening(s) to create a loosely compacted soil layer suitable for plant growth. Hardscape may then be formed directly on or over the soil forms, so that the legs and top members of the soil forms support the weight of the hardscape and any corresponding pedestrian or vehicle traffic, while the soil layer remains in its uncompacted state. In this manner, vegetation may grow to a fuller extent than possible under conventional hardscape. Furthermore, the soil forms allow soil to be poured therethrough during the hardscape construction process, and hardscape to be formed directly thereon, thus facilitating quicker and easier hardscape construction.

A volume of the soil form may be defined by outer edges of the base, the one or more legs, and the first top member. In such embodiments, soil forms may be configured such that eighty five percent or more of the defined volume may be free volume available to accept soil.

The one or more legs may comprise any material, for example they may comprise an unreinforced plastic such as high density polyethylene (HDPE).

The one or more legs, the one or more first top members, and the second top member may be sized and shaped to support a load of at least approximately 15 psi across substantially the entire one or more first top members and the entire second top member.

The one or more legs may be hollow legs sized and shaped to accept the hardscape material therein, such that hardscape material may be poured into the legs during the hardscape construction or forming process. In this manner, the legs may automatically allow the formation of hardscape pillars during hardscape formation, which further support the overlying hardscape and vehicle/pedestrian traffic. To that end, the one or more hollow legs may also be sized and shaped to accept rebar therein.

In some embodiments, the base may comprise a plurality of bottom members that are attachable to each other. In further embodiments, these bottom members may comprise snap fittings.

In some embodiments, the one or more legs may each have a cross-sectional shape having a plurality of protrusions.

The base may also comprise a plurality of posts each configured to accept a corresponding one of the legs; and a plurality of cross members each configured for coupling between two of the posts.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to a soil form structure for supporting hardscape and corresponding vehicle, pedestrian traffic, and other loads while maintaining uncompacted or loosely compacted soil underneath. A number of cell structures may be coupled to each other, where each cell has a strong yet lightweight and open structure that can accept uncompacted soil, vegetation roots, utilities, and the like within at least approximately 85-90% of its volume, while also allowing hardscape to be poured or formed thereon. Thus, cell structures allow for hardscape to be integrally formed with the cell structures, without need for an underlying layer of highly compacted soil or other hardscape support.

Figure 1:
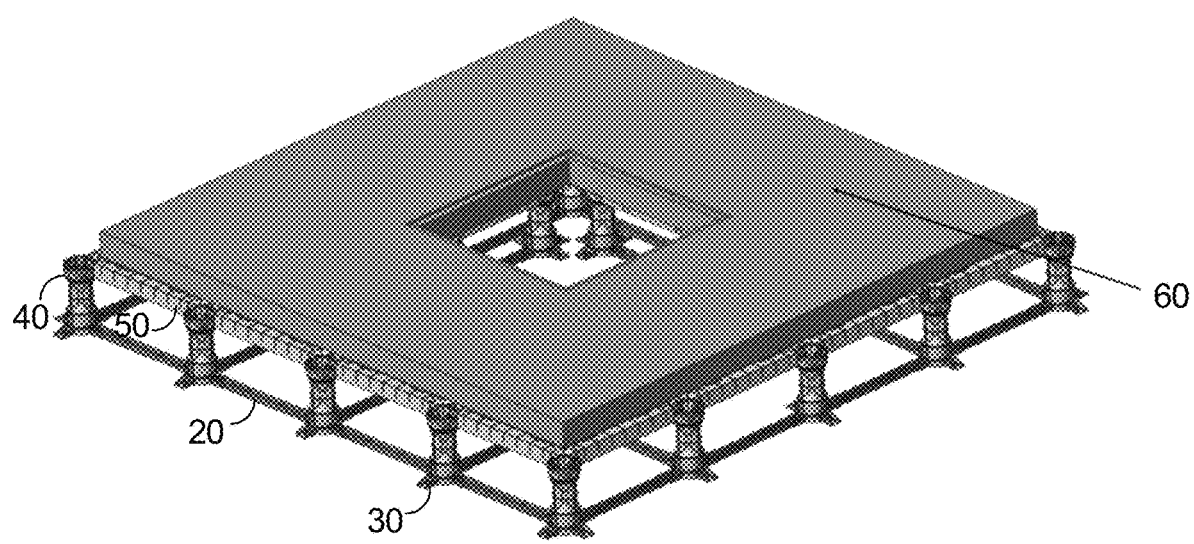
FIG. 1 illustrates construction and operation of an exemplary soil form system, in accordance with embodiments of the disclosure.

FIG. 1 illustrates construction and operation of an exemplary soil form system, in accordance with embodiments of the disclosure. Here, a soil form system 10 employs a number of bottom members 20 interconnected to posts 30 that each support a leg 40. Legs 40 are structural members that are both connected to top members 50 and support overlying hardscape 60 that is formed thereon. The legs 40 and top members 50 are structural members sized, shaped, and made of materials sufficient to act as structural members bearing the entire load of the hardscape 60 (e.g., a rigid layer sufficient to support vehicle and pedestrian traffic, such as a concrete or asphalt roadway or sidewalk, a layer of pavers, or the like) as well as any loads thereon (e.g., pedestrian and vehicle traffic, as well as objects placed thereon such as mailboxes, parking meters, guardrails, and the like).

The soil form system 10 may be made up of a number of interconnected cells, where each cell structure is a square or rectangular assembly of, in the embodiment shown, four legs 40 positioned in a square or rectangular arrangement within posts 30 and interconnected by four bottom members 20 and four top members 50. It is noted that the soil form system 10 may be constructed of any number of interconnected cells, arranged in any manner and layout, to create a soil form system 10 of any size and shape. For example, FIG. 1 shows a soil form system 10 whose cells are arranged to form an opening in the center thereof. Soil form system 10 may extend in any direction using any number of interconnected cells, to form and support any size, shape or length of hardscape. Furthermore, in some embodiments, it is preferable for these interconnected cells to support loads in accordance with known AASHTO (American Association of State Highway and Transportation Officials) H-20 load requirements.

Loosely compacted or uncompacted soil may be placed within the intervening space within the cells of soil form system 10. For example, prior to formation of hardscape 60, soil may be placed within the cells. The cells support the weight of subsequently formed hardscape 60, so that the soil within the cells is not subjected to any load from the hardscape 60 or any loading thereon. Accordingly, the soil form system 10 maintains the soil in an uncompacted or loosely compacted state that is suitable for root growth and propagation therein. Thus, for example, trees or other vegetation may be planted within the central opening in the system 10 of FIG. 1, and their roots may grow and propagate substantially unimpeded throughout the entire volume of the soil within the cells. The soil form system 10 thus allows trees or other vegetation to grow to a much greater degree, as compared to trees or vegetation planted within conventional hardscape whose highly compacted soil prevents root growth therethrough and stunts the growth of any such plant life.

Figure 2:
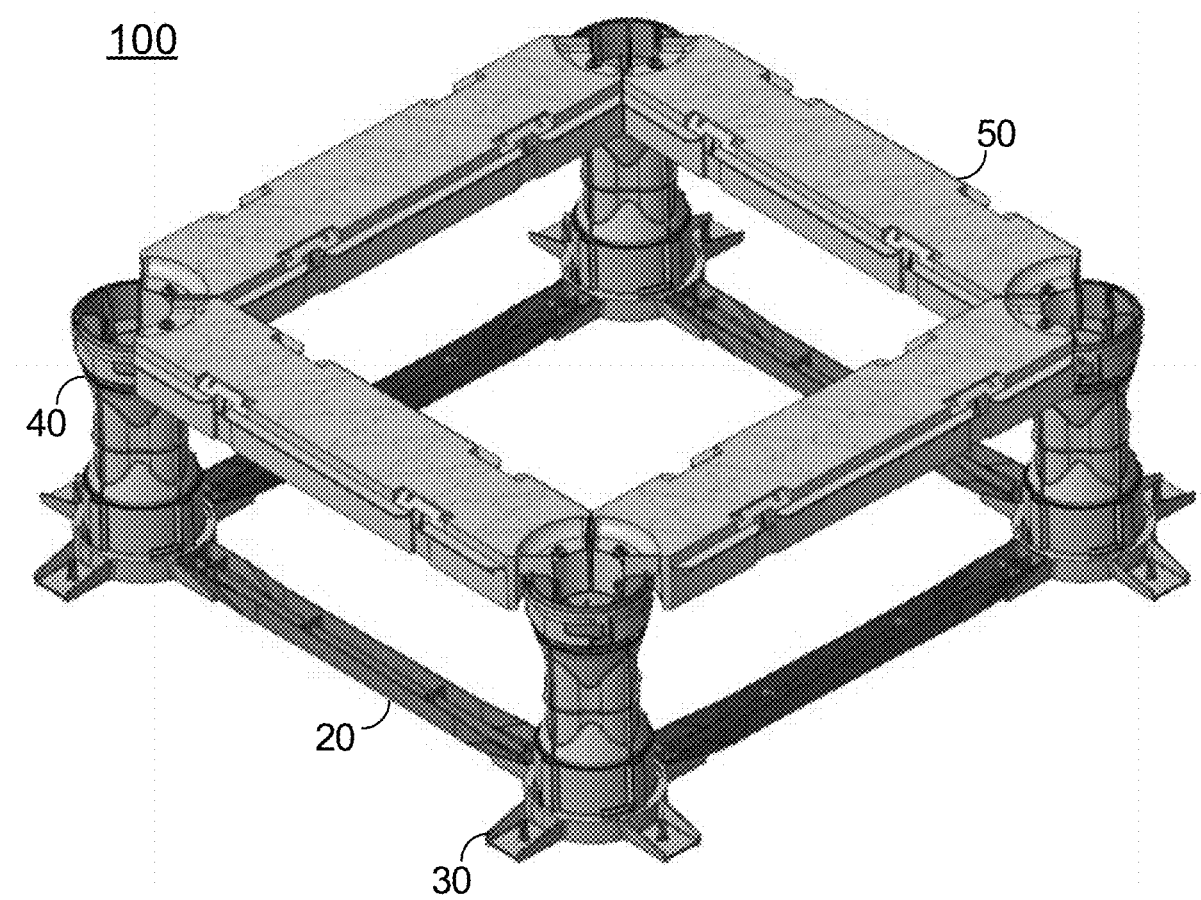
FIG. 2 is an isometric view of a single cell structure of a soil form system with an opening formed by its top members, in accordance with embodiments of the disclosure.

Soil form system 10 may be constructed by positioning posts 30 on a rigid surface such as a bedrock surface, highly compacted soil, or the like. As above, the posts 30 may be placed and arranged in any shape or manner. Adjacent posts 30 are then connected by bottom members 20 and top members 50. FIG. 2 is an isometric view of a single cell structure constructed in such a manner. Bottom members 20 and top members 50 may be of any size and shape desired, and may be made of any material and be of any size suitable for securing posts 30 against lateral movement. Top members 50 may also be of any size and shape that provides an opening between adjacent legs 40. As shown in FIG. 2, the four top members 50 of a single cell may be arranged in a hollow square or rectangular configuration that defines an opening within. Thus, once the cell structures of FIG. 2 are constructed, loosely compacted soil may simply be poured into the cells to fill their volume. In this manner, soil form system 10 may be easily filled with soil, facilitating relatively easy formation of a soil layer for vegetation growth. To that end, cells of soil form system 10 may be made of sufficient size to relatively easily accept loose soil. As one example, cells of soil form system 10 may be constructed with posts 30 placed 36 inches center to center distance from each other, although any distances are contemplated.

Figure 3:
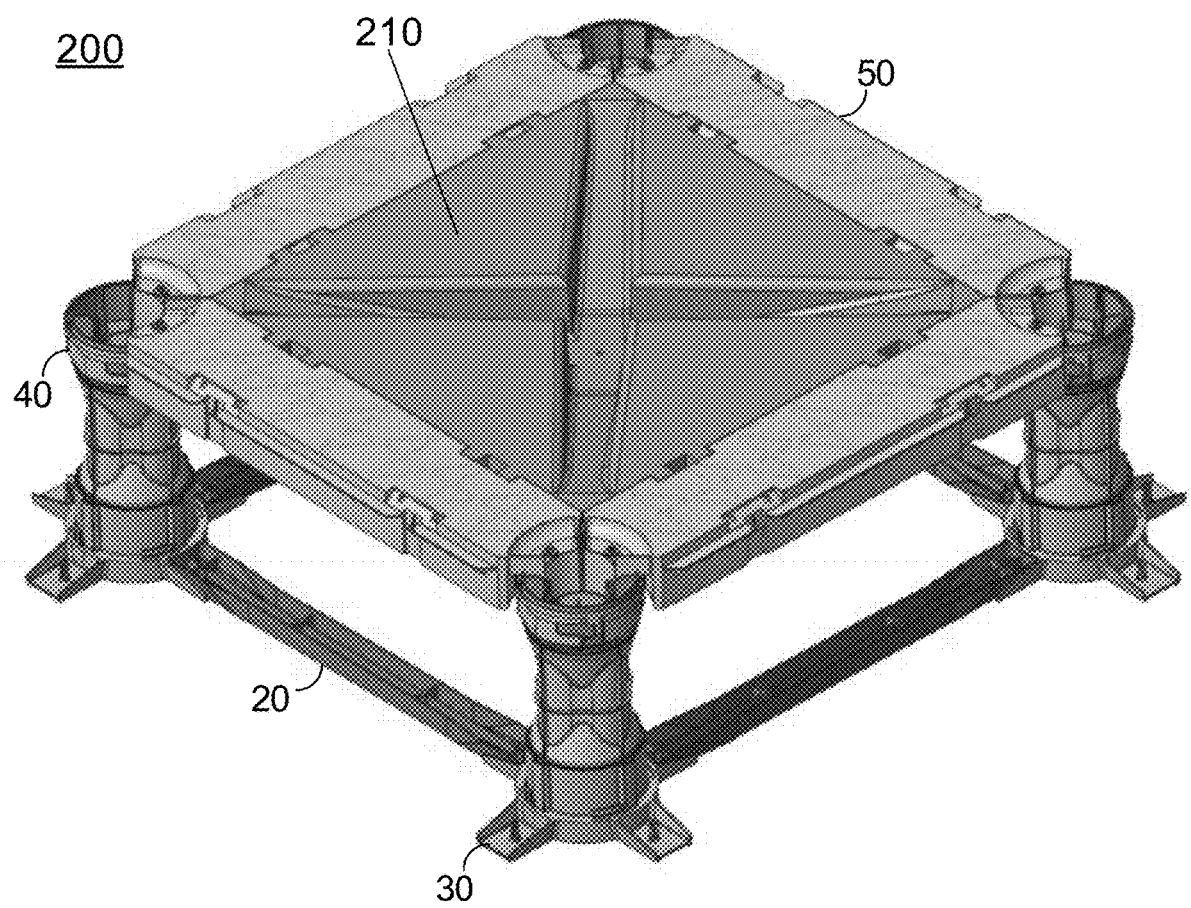
FIG. 3 is an isometric view of the single cell structure of FIG. 2, with its second top member added to cover the opening shown in FIG. 2.

Once soil is placed within the cells of soil form system 10, a cover 210 may be affixed to the top members 50 of each cell to cover the opening therein, as shown in FIG. 3. This creates a continuous upper surface upon which a concrete layer or other hardscape may be formed (in some embodiments, along with an intervening geotextile and/or aggregate layer) without contacting the loosely compacted soil underneath. The cover 210 may be formed of any size and shape to cover the opening between top members 50 of a cell, and may be formed of any thickness and any material suitable for supporting hardscape 60 and loads placed thereon. Cover 210 may also be formed with any desired features, such as the cross-shaped depression shown in FIG. 3. Such features may provide any desired functionality, such as improved stackability allowing multiple covers 210 to be stacked upon each other in compact manner without slipping, increased thickness and strength of overlying hardscape 60, prevention of lateral slipping of hardscape 60, or the like.

In the resulting configuration, one of ordinary skill in the art will observe that the cells of system 10 support the weight of their overlying hardscape 60 formed thereon, as well as any traffic (foot and/or vehicle) that passes thereover. As the cells support this weight, the soil or other vegetation growth medium is left substantially uncompacted, supporting only its own weight. Accordingly, the rootball of such a tree, or root system of other vegetation, is surrounded with a significant volume of substantially loosely compacted soil, which allows the roots of this vegetation to grow therethrough, providing space and a suitable medium for the roots to grow to their full natural size relatively unencumbered. This is in contrast to many conventional urban vegetation growth sites, which are surrounded by hardscape such as concrete roads and sidewalks that require their underlying earth to be packed so densely and solidly to support the hardscape, that roots cannot grow therethrough, thus stunting their growth as well as that of the vegetation. Thus, embodiments of the invention allow for growth of large trees or other vegetation in areas where they could not be grown before, in particular dense urban areas containing significant hardscape covering. This also allows for much more stormwater retention in these areas, which is a significant advantage over conventional dense urban areas, whose hardscape covering typically converts most stormwater to relatively useless runoff that also contributes to problems such as flooding and the like. Instead of simply producing runoff, embodiments of the invention retain stormwater, using it to water trees and provide other benefits, while also reducing the problems commonly associated with runoff, such as flooding.

Retention of stormwater also provides further benefits, such as pollutant removal and cleaning of runoff water. More specifically, both the loosely compacted soil and tree roots clean and/or filter water that they capture. Accordingly, instead of simply producing runoff that becomes contaminated as it picks up impurities and chemicals from the ground, embodiments of the invention retain and clean stormwater so that it can be used in tree or plant growth, etc.

Since system 10 supports substantially the entire weight of overlying hardscape, commercial traffic, and other loads such as objects placed on the hardscape, the soil or root growth medium does not experience any compressive force except that of its own weight. Accordingly, the system 10 can maintain the soil or root growth medium in an uncompacted state, e.g., at approximately 80% proctor or less (roughly corresponding to compaction by human foot, or less). In contrast, the hard-packed soil created by general construction is typically 90-95% proctor or so, which is known to be effectively impenetrable to tree roots. Trees planted in typical construction sites, such as under pavement supported by hard-packed soil, commonly only have a small area in which to grow roots (usually a small volume dug out from the hard-packed soil of a construction area), resulting in a stunted root system and a smaller, less healthy tree. In contrast, the system 10 of embodiments of the disclosure allows for large areas of substantially uncompacted, or loosely compacted, soil to exist even under or next to construction sites and other areas of hard-packed soil, resulting in growth of large, healthy trees even in areas that could not conventionally support such trees, like dense urban areas covered by concrete or asphalt.

Figure 4A:
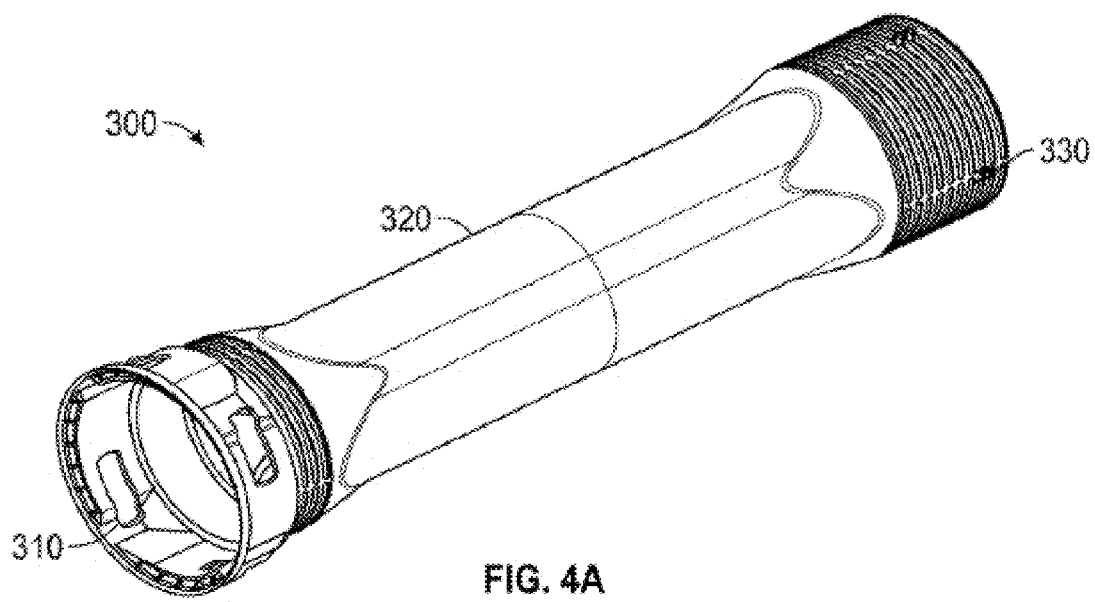
FIG. 4A is an isometric view of one embodiment of a leg of a soil form system constructed in accordance with embodiments of the disclosure.
Figure 4B:
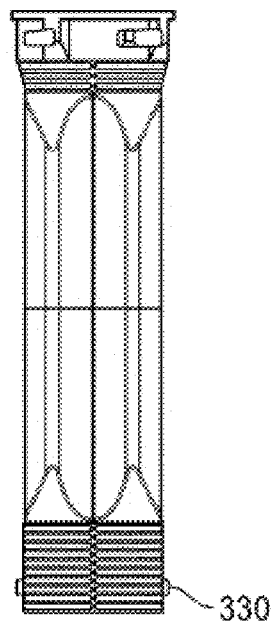
FIG. 4B is a side view of the leg of FIG. 4A.
Figure 4C:
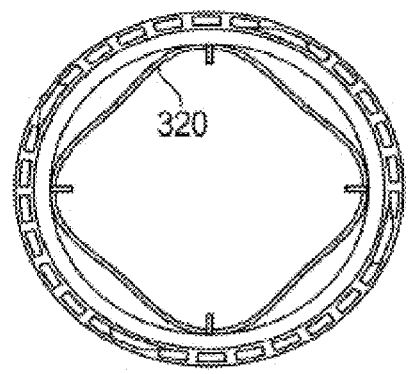
FIG. 4C is a cross-section view of a center portion of the leg of FIG. 4A.

FIGS. 4A-4C illustrate further details of a configuration of legs 40 in accordance with embodiments of the disclosure. Here, leg 300 includes ends with features 310 and 330 for connection to the posts 30 and top members 50 respectively, as well as a central portion with longitudinal protrusions 320. The features 310, 330 are features allowing for turn and lock connection to the posts 30. For example, the features 310, 330 can be slots and a corresponding pin or other extension sized to fit into the slot so that turning the leg 300 secures the pin in the slot. The features 310, 330 are configured to allow turn and lock connection to both the posts 30 and another leg or the top members 50. For instance, the lower end of leg 300 has slots as features 310, while the upper end of leg 300 has pins or extensions as features 330, while the posts 30 may have pins or extensions, and the corresponding portions of the top members 50 may have snap fit joints. This allows the leg 300 to be turned and locked into place within a recess of post 30, whereupon either the lower end of another leg can be turned and locked onto the upper end of leg 300, or the top members 50 can be snapped into place on the upper end of leg 300. If another leg is attached to the upper end of leg 300, the top 120 is snapped onto the upper end of that added leg.

The longitudinal protrusions 320 extend outward, adding to the radius of the leg 300 and thus improving the strength of the leg 300. In particular, the protrusions 300 improve the bending stiffness and buckling strength of the leg 300, as would be understood by one of ordinary skill in the art. The protrusions 320 can be oriented so that the center of each protrusion 320, i.e. the point of maximum height or distance from the central axis of leg 300, is oriented parallel to one of the bottom members 20 or top members 50. It has been found that this orientation provides desirable resistance to buckling. However, it should be noted that any number and orientation of protrusions 300 is contemplated. Also, the protrusions 320 can be of any cross-sectional shape. The shape of each protrusion 320 is not limited to the curved or domelike cross-sectional shape shown in FIG. 4C, but can be any cross-sectional shape that improves the strength of its leg 300.

Figure 5A:
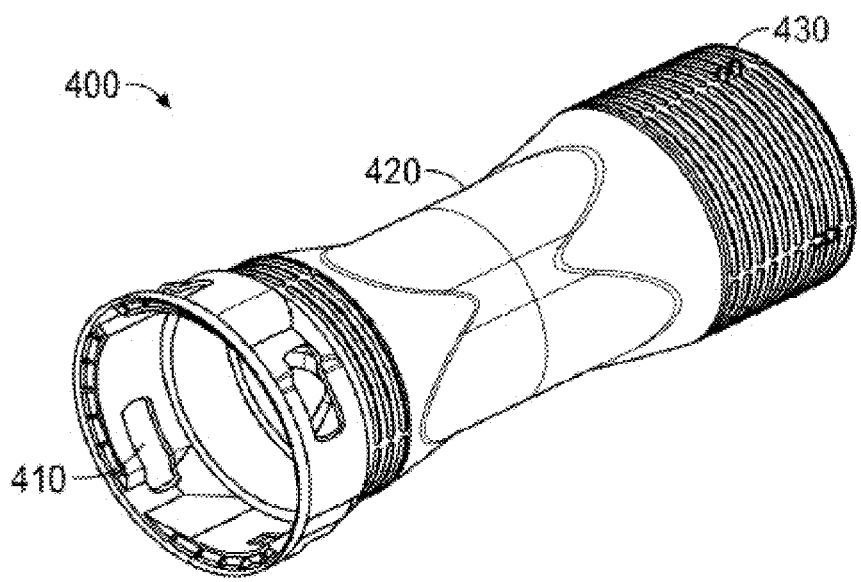
FIG. 5A is an isometric view of another embodiment of a leg of a soil form system constructed in accordance with embodiments of the disclosure.
Figure 5B:
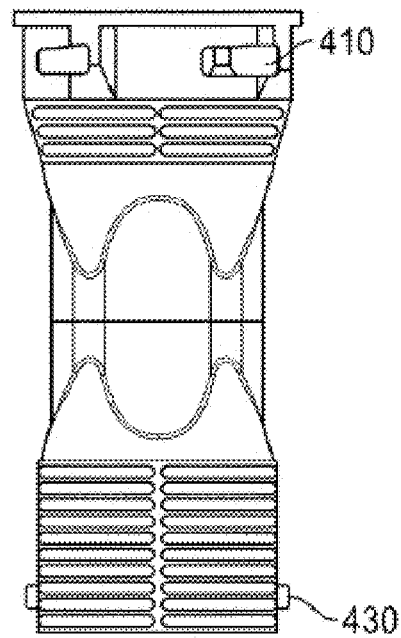
FIG. 5B is a side view of the leg of FIG. 5A.
Figure 5C:
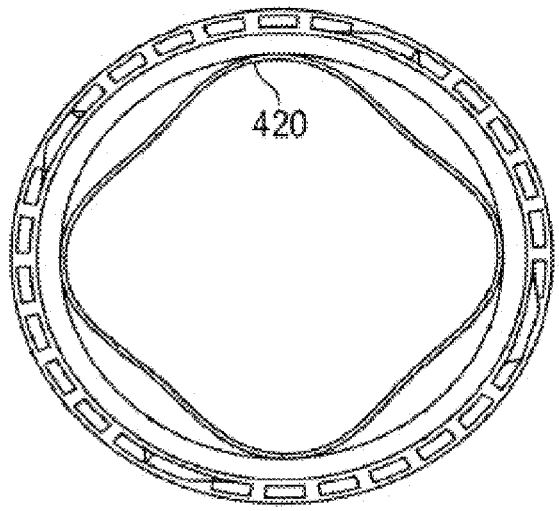
FIG. 5C is a cross-section view of a center portion of the leg of FIG. 5A.

FIGS. 5A-5C illustrate further details of another embodiment of leg 40. Similar to the longer leg 300, shorter leg 400 has features 410, 430 that are similar to the respective features 310, 330 of longer leg 300. That is, features 410, 430 can be slots and pins/extensions respectively, which allow the shorter leg 400 to lock within recesses of posts 30, and to be snapped onto the top members 50. Also, longitudinal protrusions 420 are shaped, and act, similar to protrusions 320 of leg 300, increasing bending stiffness and buckling resistance.

In embodiments of the disclosure, cells can utilize only the longer legs 300, only the shorter legs 400, a longer leg 300 combined with a shorter leg 400, or a shorter leg 400 combined with another shorter leg 400. This allows for cells of at least four different heights.

Figure 6A:
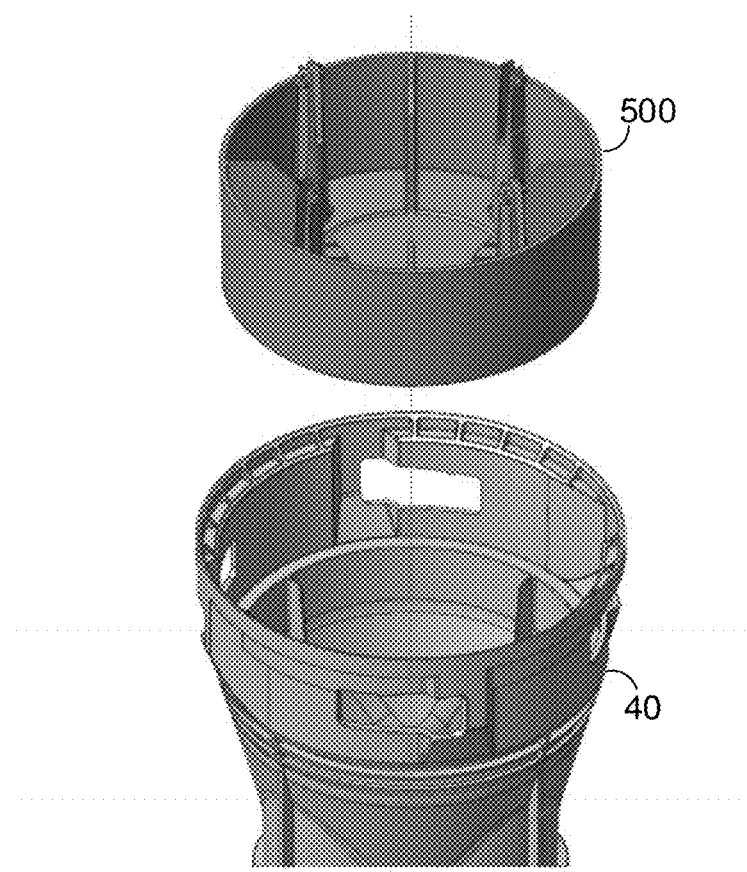
FIG. 6A is a more detailed isometric view of an exemplary leg and receiving cup, in accordance with embodiments of the disclosure.
Figure 6B:
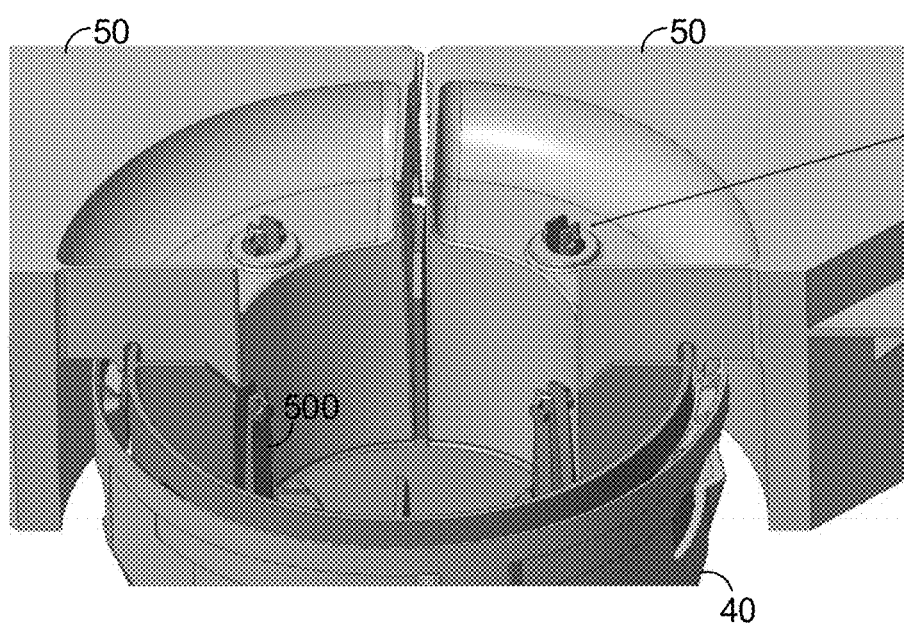
FIG. 6B is an isometric view showing further details of a connection among a leg, a receiving cup, and top members, in accordance with embodiments of the disclosure.

FIG. 6A is a more detailed isometric view of an exemplary leg and receiving cup, in accordance with embodiments of the disclosure, and FIG. 6B is an isometric view showing further details of a connection among a leg, a receiving cup, and top members, in accordance with embodiments of the disclosure. More specifically, top members 50 may be directly attached to snap fit or other features in legs 40, or top members 50 may be indirectly attached to legs 40 via an intermediate receiving cup 500. In further detail, a receiving cup 500 may be placed into an upper opening of leg 40 and attached thereto via, e.g., a friction fitting, a snap fit or turn and lock fitting using any suitable features formed on either one or both of the receiving cup 500 and leg 40, or the like. Top members 50 may then be affixed to the receiving cup 500 via any suitable connection mechanism, such as snap fit features like those shown in FIG. 6B. In some embodiments of the disclosure, the receiving cup 500 may be omitted and the top members 50 may be affixed to the leg 40, such as by snap fit, friction fit, turn and lock fit, or the like, and concrete or other hardscape material may be poured therethrough and into the hollow body of each leg 40. This may improve the strength and thus axial load bearing capability of the legs 40. In such a configuration, rebar or other reinforcing material may be placed within the legs 40 as well, for added strength. Alternatively, in some other embodiments of the disclosure, receiving cups 500 may be placed between legs 40 and top members 50 to prevent concrete or other hardscape material from flowing into the legs 40.

Figure 7:
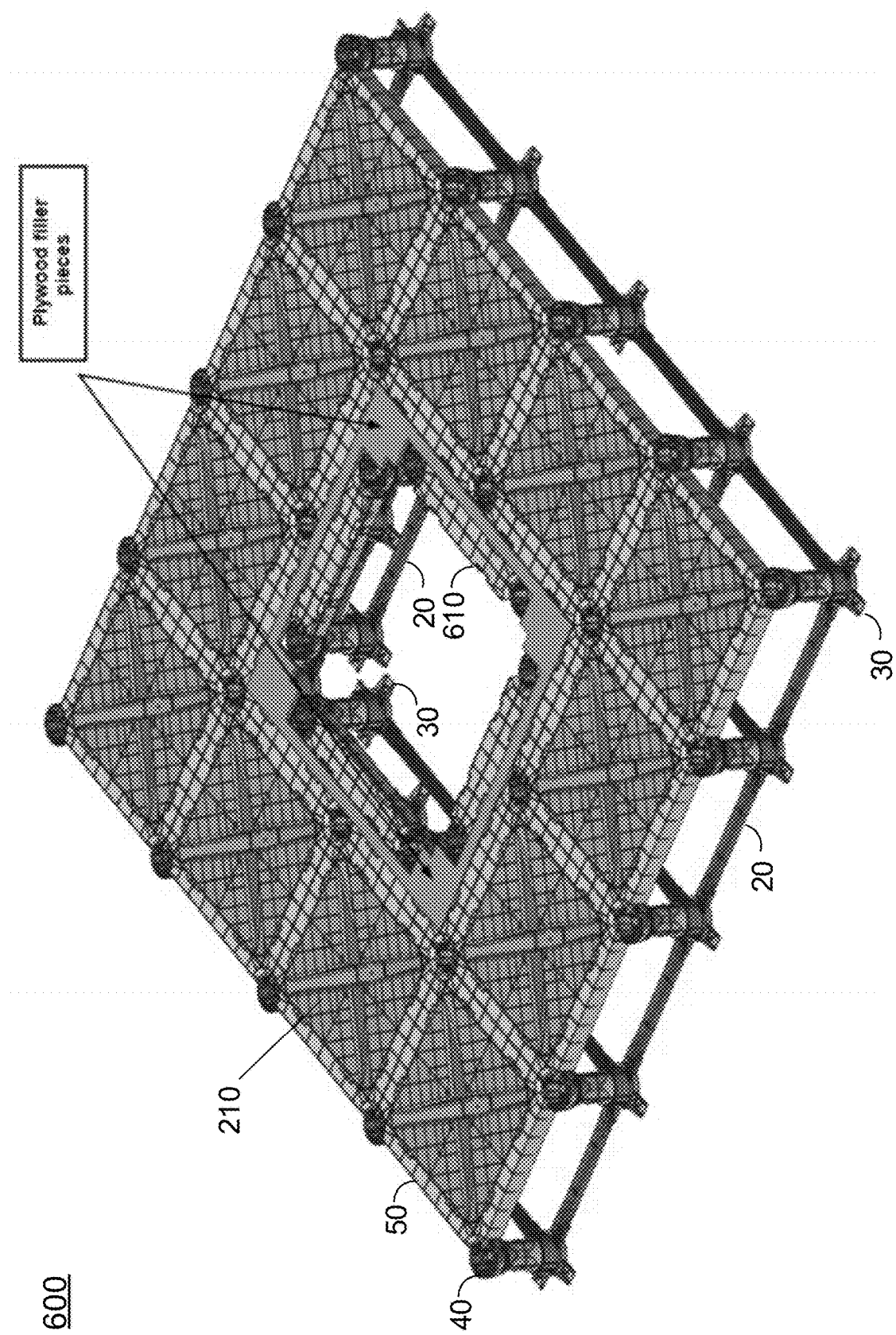
FIG. 7 is an isometric view of an exemplary soil form system and filler panels, in accordance with embodiments of the disclosure.

As above, soil form system 10 may be constructed with any number of cells, arranged in any manner. FIG. 1, for example, illustrates a 4×4 assembly of cells, with a 2×2 central opening for placement of a tree or other vegetation. Alternative cell arrangements may be employed, to form any desired size and shape of hardscape, and any size and shape of opening. Furthermore, openings may be made of any size besides simply an integer multiple of the size of a single cell. In some embodiments of the disclosure, filler panels may be employed to generate openings of various sizes. FIG. 7 is an isometric view of an exemplary soil form system and filler panels, in accordance with embodiments of the disclosure. Here, filler panels may be placed within the central opening of a soil form system 600 as shown, to reduce the size of the central opening as desired. Filler panels may be supported by top members 610 that are sized to accept the filler panels, as shown within the central opening of soil form system 600. Top members 610 may be of the same dimensions as top members 50, or may be differently sized to accommodate filler panels of any desired size and shape. Top members 610 are affixed to, and supported by, posts 30 and legs 40 as shown, and interconnected by bottom members 20 as described previously. The top members 610, posts 30, legs 40 and bottom members 20 placed within the central opening may be placed to support the filler panels, and thus may or may not be connected to any other cells of soil form system 600. Embodiments of the disclosure contemplate both connection to other cells of system 600, by either the same or custom connecting elements, and freestanding filler panel supports that are not connected to any surrounding cells of system 600.

Figure 8:
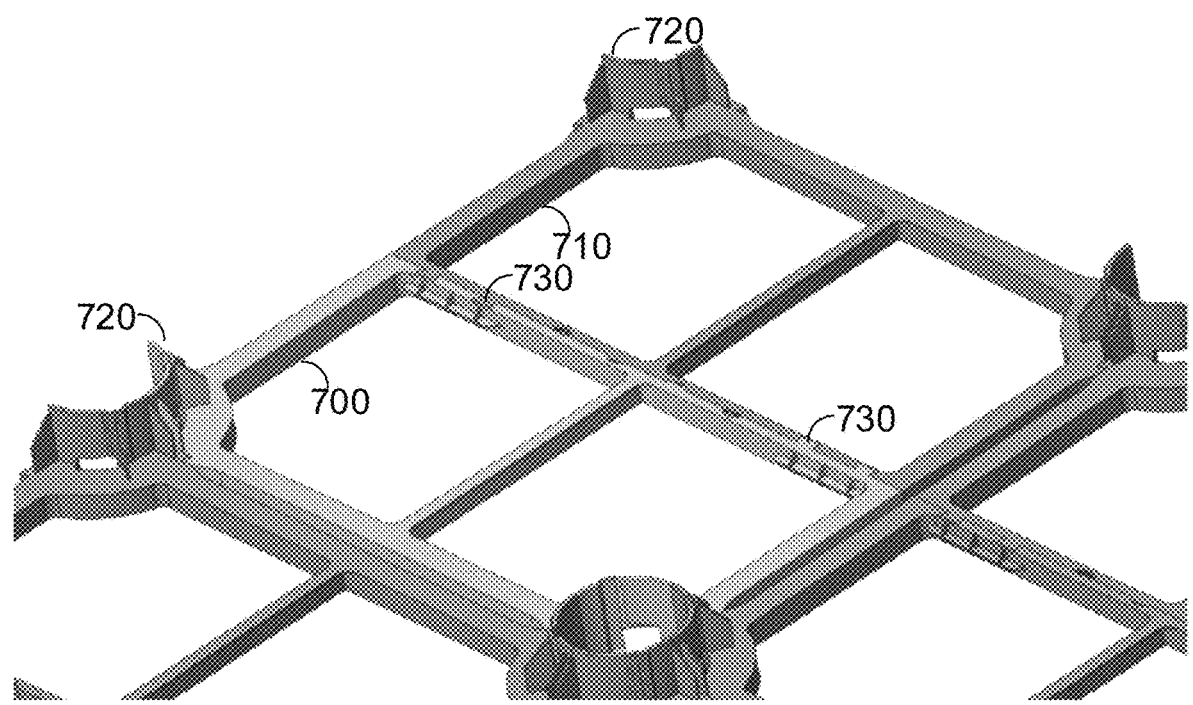
FIG. 8 is an isometric assembly view of a base, in accordance with further embodiments of the disclosure.

Embodiments of the disclosure contemplate any base structure for supporting or securing legs 40. As above, embodiments of the disclosure contemplate base structures formed by four (or any other number of) bottom members 20 and posts 30. However, any other base structure suitable for securing legs 40 is contemplated. As one such example, posts 30 and bottom members 20 may be combined as an integral base structure that performs the functions of both elements 20 and 30. FIG. 8 is an isometric assembly view of one such base structure, constructed in accordance with further embodiments of the disclosure. Here, a base structure is made up of a first base portion 700 and a second base portion 710, that each have recessed portions 720 that, when combined to form cell structures, form receptacles accepting and securing legs 40 therein. More specifically, recessed portions 720 may be configured with the above described attachment structures formed thereon, such as turn and lock features, snap fit features, or the like. In this manner, legs 40 may be placed within the receptacles formed by, in this embodiment, four recessed portions 720, and secured therein.

The first base portions 700 and second base portions 710 may be affixed to each other to form a single integral base for one cell structure. First portions 700 and second portions 710 may be affixed to each other in any manner, such as via grooves 730 formed in corresponding portions 700, 710 to provide a friction fit. Any mechanism for coupling first portions 700 and second portions 710 to each other is contemplated.

Embodiments of the disclosure contemplate any suitable materials for use in any of the elements of system 10. As one example, the bottom members 20, posts 30, legs 40, top members 50, and cover 210 may each be made of injection molded HDPE, or any other material such as a glass-filled resin (e.g., 30% glass-filled polypropylene) or the like.

The above and other embodiments are configured to support the weight of overlying hardscape (e.g. a standard concrete or asphalt roadway, pavers, etc.) and aggregate that cover the entire upper surface of the cell, as well as commercial vehicle traffic (e.g., trucks, cars, emergency vehicles, and any other vehicles commonly found on roadways) thereover, to a degree at least equivalent to an H-20 loading condition. For example, the above and other embodiments can support a load of at least 21.0 psi when the hardscape 60 is pavers with concrete, and at least 15 psi when the hardscape 60 is just pavers.

One notable advantageous application of soil form system 10 is stormwater management. As one example, system 10 can be used to create a ponding area for storing rainwater runoff. In such an application, a number of cells of system 10 may be placed under hardscape, and may or may not be filled with soil. Openings in system 10, and trees, may or may not be present. Ingress and egress for water are provided, such as a runoff drain or simply an open area in the overlying hardscape, as well as an underdrain that may extend into the volume outlined by system 10 to convey excess water somewhere else, such as to a primary stormwater system.

Another application of system 10 is that of underground bioretention systems. A bioretention system, sometimes referred to as a rain garden, is typically a volume of soil and/or other materials used to collect and hold runoff water, and remove pollutants therefrom. Stormwater is typically collected into a treatment area, which is an area of ground containing different layers such as a grass strip, sand bed, one or more organic layers, soil, and plants.

These layers collect the runoff water, filter and aerate it, support the growth of microorganisms which break down certain undesired compounds in the runoff water such as hydrocarbons, and absorb other undesired compounds. The "cleaned" runoff water then gradually propagates into the soil surrounding the bioretention system, evaporates away, or can be removed for use elsewhere. The system 10 can create such a bioretention system underground. For example, the configuration of FIG. 1 can be filled not with solely conventional soil as in some above-described applications, but with layers that constitute a bioretention system. As above, such layers can include a sand bed, one or more organic layers, soil of any type, or the like. Embodiments of the invention encompass any material layers suitable for use in a bioretention system. Ingress and egress for runoff water may also be added if desired, such as drains or pipes that convey water into and out of the system 10.

Runoff water is thus channeled into the system 10, where the various layers as well as the roots of any vegetation placed within openings in system 10 filter, aerate, and break down pollutants in the water. The water is then taken up by the system 10, evaporates, enters the surrounding soil, or is removed by the water egress. In this manner, system 10 of embodiments of the disclosure can be deployed to create an underground bioretention system that serves the dual purpose of supporting tree growth and has the added advantage of utilizing the tree and its root system to improve the function of the system.

It should be noted that bioretention systems formed utilizing embodiments of the present invention offer significant advantages over conventional bioretention systems. For example, conventional bioretention systems are known to degrade over time. In contrast, it has been found that bioretention systems constructed according to embodiments of the present invention actually improve over time. In particular, as the trees within it grow larger and more mature root systems, the larger root system absorbs more water and removes more pollutants. It has also unexpectedly been found that the benefit imparted to bioretention systems by incorporating trees within is a greater than linear benefit. That is, such systems improve in greater than linear manner as a function of tree growth, with larger trees offering much more benefit (water absorption and pollutant absorption/breakdown) than smaller ones.

It should further be noted that these above mentioned advantageous embodiments all come with the further benefit of more efficient land use. System 10 is sufficient to support conventional hardscape above. Thus, all of the above advantageous embodiments can be implemented belowground without compromising any of the conventional structures or systems aboveground. For example, bioretention systems, stormwater retention systems, and the like can all be implemented underneath sidewalks and streets, so that they do not reduce the amount of parking spaces available. Larger trees can be grown without reducing the amount of sidewalk available for walking. In this manner, the above described advantages can be accomplished without reducing the aboveground real estate available for conventional uses.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, soil form systems of embodiments of the disclosure may be constructed of any number of cell structures, arranged in any manner, and being constructed of elements having any sizes and shapes. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A system for forming and maintaining hardscape over loosely compacted soil, the system comprising:
    a base;
    one or more legs affixable to the base, wherein the one or more legs are hollow legs sized and shaped to accept the hardscape material therein and are sized and shaped to accept rebar therein;
    one or more first top members affixable to the one or more legs and having an opening therein; and
    a second top member affixable to the one or more first top members to cover the opening;
    wherein the base, the one or more legs when affixed to the base, and the first top member when affixed to the one or more legs, define a volume;
    wherein the opening is sized to accept loosely compacted soil poured therethrough and into the volume; and
    wherein the one or more legs, the one or more first top members, and the second top member are configured to accept and support both a hardscape formed on the one or more first top members and the second top member, and a traffic load thereon, while maintaining the soil within the volume in the loosely compacted state.

2. The system of claim 1, wherein the volume is defined by outer edges of the base, the one or more legs, and the first top member, and wherein eighty five percent or more of the defined volume is free volume available to accept the soil.

3. The system of claim 1, wherein the one or more legs comprise an unreinforced plastic.

4. The system of claim 1, wherein the one or more legs, the one or more first top members, and the second top member are sized and shaped to support a load of at least approximately 15 psi across substantially the entire one or more first top members and the entire second top member.

5. The system of claim 1, wherein the one or more legs are hollow legs sized and shaped to accept the hardscape material therein.

6. The system of claim 5, wherein the one or more hollow legs are sized and shaped to accept rebar therein.

7. The system of claim 1, wherein the base comprises a plurality of bottom members that are attachable to each other.

8. The system of claim 7, wherein the bottom members comprise snap fittings.

9. The system of claim 1, wherein the one or more legs each have a cross-sectional shape having a plurality of protrusions.

10. The system of claim 1, wherein the base comprises
    a plurality of posts each configured to accept a corresponding one of the legs; and
    a plurality of cross members each configured for coupling between two of the posts.

11. A system for forming and maintaining hardscape over loosely compacted soil, the system comprising:
    a base;
    one or more legs affixable to the base, wherein the one or more legs are hollow and comprise a receiving cup configured to prevent material from entering the respective leg;
    one or more first top members affixable to the one or more legs and having an opening therein; and
    a second top member affixable to the one or more first top members to cover the opening;
    wherein the base, the one or more legs when affixed to the base, and the first top member when affixed to the one or more legs, define a volume;
    wherein the opening is sized to accept loosely compacted soil poured therethrough and into the volume; and
    wherein the one or more legs, the one or more first top members, and the second top member are configured to accept and support both a hardscape formed on the one or more first top members and the second top member, and a traffic load thereon, while maintaining the soil within the volume in the loosely compacted state.

12. The system of claim 11, wherein the volume is defined by outer edges of the base, the one or more legs, and the first top member, and wherein eighty five percent or more of the defined volume is free volume available to accept the soil.

13. The system of claim 11, wherein the one or more legs comprise an unreinforced plastic.

14. The system of claim 11, wherein the one or more legs, the one or more first top members, and the second top member are sized and shaped to support a load of at least approximately 15 psi across substantially the entire one or more first top members and the entire second top member.

15. The system of claim 11, wherein the one or more legs are hollow legs sized and shaped to accept the hardscape material therein.

16. The system of claim 15, wherein the one or more hollow legs are sized and shaped to accept rebar therein.

17. The system of claim 11, wherein the base comprises a plurality of bottom members that are attachable to each other.

18. The system of claim 17, wherein the bottom members comprise snap fittings.

19. The system of claim 11, wherein the one or more legs each have a cross-sectional shape having a plurality of protrusions.

20. The system of claim 11, wherein the base comprises
a plurality of posts each configured to accept a corresponding one of the legs; and
a plurality of cross members each configured for coupling between two of the posts.

* * * * *